(12) United States Patent
Caisley

(10) Patent No.: US 7,772,979 B2
(45) Date of Patent: Aug. 10, 2010

(54) EAR TAG ELEMENT AND METHODS FOR PRODUCING AN EAR TAG ELEMENT

(75) Inventor: Roy Caisley, Isselburg-Vehlingen (DE)

(73) Assignee: Reinhard Nehls, Bocholt (DE)

( * ) Notice: Subject to any disclaimer, the term of this patent is extended or adjusted under 35 U.S.C. 154(b) by 612 days.

(21) Appl. No.: 11/660,800

(22) PCT Filed: Aug. 18, 2005

(86) PCT No.: PCT/IB2005/002442

§ 371 (c)(1),
(2), (4) Date: Jun. 6, 2007

(87) PCT Pub. No.: WO2006/021855

PCT Pub. Date: Mar. 2, 2006

(65) Prior Publication Data

US 2009/0278693 A1 Nov. 12, 2009

(30) Foreign Application Priority Data

Aug. 27, 2004 (NL) .................................... 1026917
Feb. 17, 2005 (NL) .................................... 1028322

(51) Int. Cl.
*G08B 13/14* (2006.01)
(52) U.S. Cl. ............... 340/572.7; 340/572.1; 340/573.1
(58) Field of Classification Search ............. 340/572.1, 340/572.7, 572.8, 573.1, 539.1, 539.11; 40/300, 40/301, 302; 119/655, 174
See application file for complete search history.

(56) References Cited

U.S. PATENT DOCUMENTS

| | | | | | |
|---|---|---|---|---|---|
| 4,102,073 | A | * | 7/1978 | Hayes | .................... 40/301 |
| 4,718,374 | A | * | 1/1988 | Hayes | .................... 119/655 |
| 4,741,117 | A | * | 5/1988 | Fearing | .................... 40/301 |
| 4,785,563 | A | | 11/1988 | Friedman | |
| 5,152,249 | A | | 10/1992 | Howe | |
| 2002/0066418 | A1 | | 6/2002 | Fearing et al. | |
| 2008/0034626 | A1 | * | 2/2008 | Brem et al. | .................... 40/300 |

FOREIGN PATENT DOCUMENTS

| | | |
|---|---|---|
| BE | 753581 | 12/1970 |
| EP | 0 639 942 | 3/1995 |
| EP | 0 941 656 | 9/1999 |
| EP | 0639842 B1 | 10/1999 |
| FR | 2 845 564 | 4/2004 |
| GB | 25481 | 4/1911 |
| WO | 8202788 | 8/1982 |
| WO | WO 01/33950 | 5/2001 |

\* cited by examiner

*Primary Examiner*—Van T. Trieu
(74) *Attorney, Agent, or Firm*—Hoffman & Baron, LLP

(57) ABSTRACT

The invention relates to an ear tag element for tagging animals and to methods for producing it. The ear tag element according to the invention comprises a body (1) and a transponder (4) which is embedded in the said body, the transponder having a chip and an antenna which are connected to one another, and the body of the ear tag element comprising a rigid part (2), a flexible part (3) and a boundary surface (6) between them. The oar tag element according to the invention is characterized by the fact that at least the antenna of the transponder lies in the boundary surface, in such a manner that the antenna on at least one side bears against the rigid part and on at least one other side bears against the flexible part of the body.

18 Claims, 3 Drawing Sheets

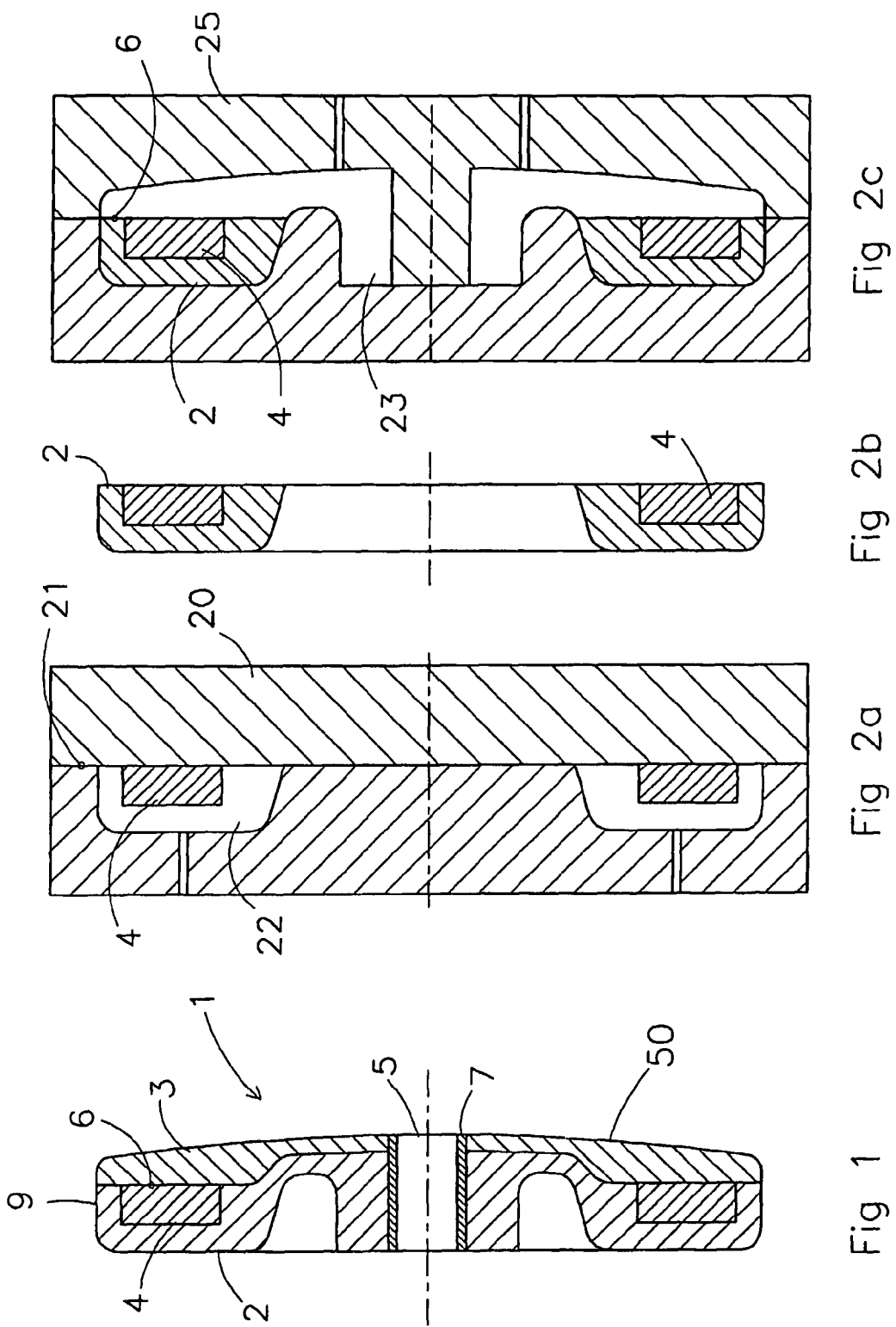

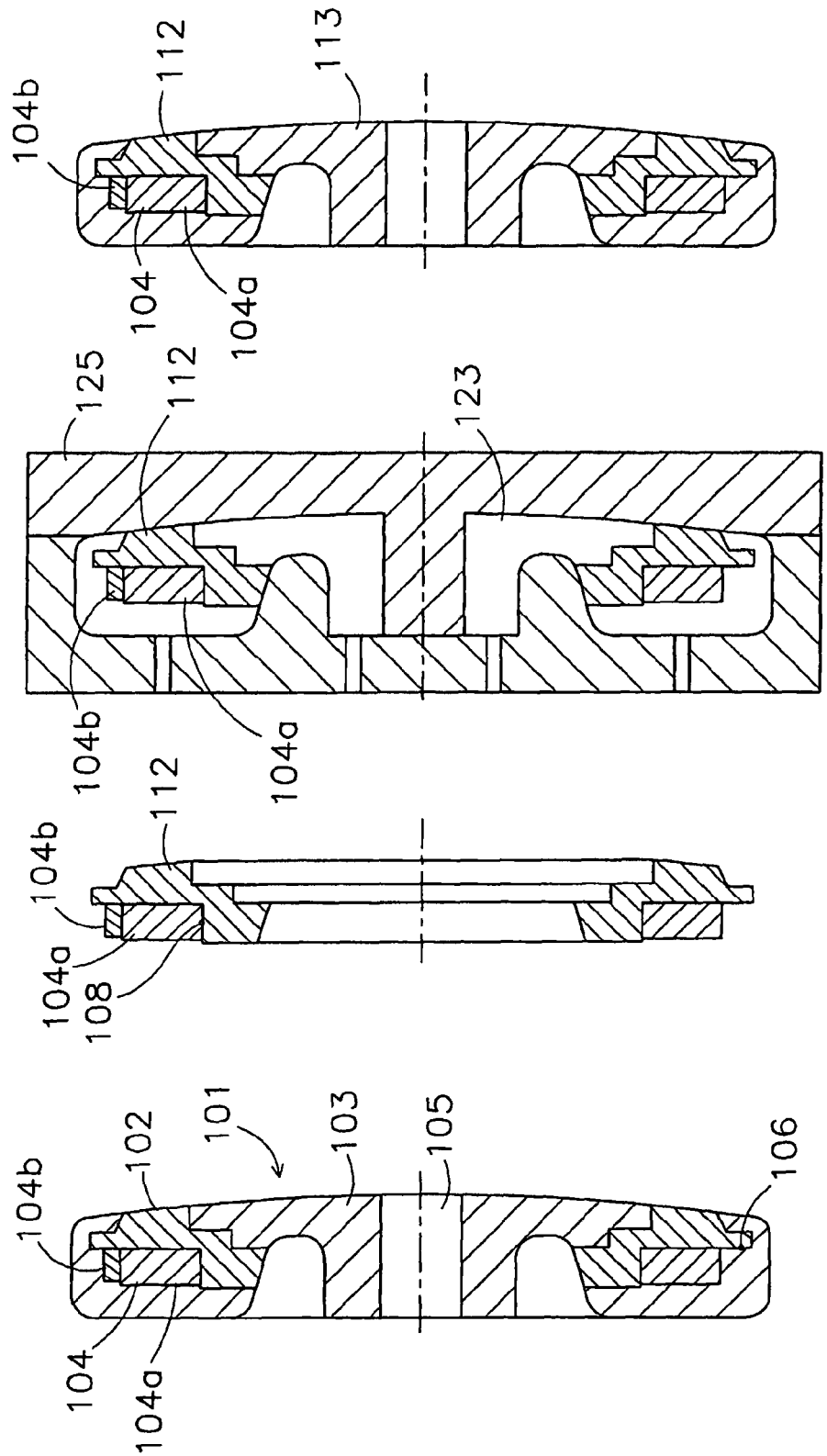

EAR TAG ELEMENT AND METHODS FOR PRODUCING AN EAR TAG ELEMENT

CROSS-REFERENCE TO RELATED APPLICATIONS:

This application is the National Stage of International Application No. PCT/LB2005/002442, filed Aug. 18, 2005, which claims the benefit of Netherlands Application Nos. NL 1026917, filed Aug. 27, 2004, and NL 1028322, filed Feb. 17, 2005, the contents of which are incorporated by reference herein.

FIELD OF THE INVENTION:

The invention relates to an ear tag element for tagging animals, which ear tag element comprises a body and a transponder which is embedded in the said body, the transponder having a chip and an antenna which are connected to one another.

In addition, the invention relates to methods for producing an ear tag element, which ear tag element comprises a body and a transponder which is embedded in the said body, the transponder having a chip and an antenna which are connected to one another.

BACKGROUND OF THE INVENTION:

EP 0 639 942 describes an ear tag element with a transponder as used in an ear tag for tagging animals. In this known ear tag element, the antenna and the chip of the transponder are arranged in a rigid transponder housing, for example made from polycarbonate, which housing protects the chip and the antenna. The transponder is embedded by injection-moulding in the body of the ear tag element, which is made from a flexible material, such as polyurethane. The housing inter alia prevents the antenna and chip of the transponder from being damaged.

The known ear tag element is undesirably expensive.

SUMMARY OF THE INVENTION:

It is an object of the invention to provide an ear tag element which can be produced in an efficient, in particular economically advantageous way.

A further object of the invention is to provide efficient, in particular economically advantageous methods for producing ear tag elements.

In the ear tag element according to a first aspect of the invention, as described in claim 1, the antenna of the transponder, and if appropriate also the chip, lies at the boundary surface between the rigid and flexible parts of the ear tag element.

When producing the known ear tag, arranging the rigid housing around the antenna and chip/transponder is a complex step. In the ear tag element according to the first aspect of the invention, there is no rigid housing around the antenna and chip of the transponder. This eliminates a laborious step from the production process, with the result that ear tag elements according to the first aspect of the invention can be produced more efficiently and more economically than the known ear tag element.

In the ear tag elements according to the first aspect of the invention, the rigid part absorbs mechanical loads without being greatly deformed, and on account of the fact that at least the antenna of the transponder bears against the rigid part, the deformation imparted to the antenna is also low. As a result, the rigid part, in combination with the position of the antenna, has the same effect as the rigid transponder housing of the known ear tag element.

The rigid part preferably has a free surface which forms part of the outer surface of the ear tag element. In use, this rigid part preferably faces away from the ear of the animal, making the ear tag element less vulnerable to damage.

The first aspect of the invention can advantageously be used in a female ear tag element which comprises a receiving opening for receiving a male ear tag element. In this embodiment, the flexible part of the body lies around the receiving opening, so that the flexibility of the flexible part enables the receiving opening to be deformed during fitting of the male ear tag element.

This embodiment is particularly advantageous for use in ear tag elements of small diameter, such as for example those used for sheep. In the case of ear tag elements with a relatively large diameter, the transponder can often be positioned far enough away from the receiving opening, so that the deformation which occurs at the receiving opening during fitting of the male element does not damage the antenna of the transponder.

In the case of ear tag elements of smaller diameter, the transponder has to be located closer to the receiving opening, i.e. in the region where relatively extensive deformation occurs during fitting of the male element. However, the rigid part of the body can offer resistance to the forces which occur during fitting of the male element, with the result that the deformation in the immediate vicinity of the rigid part is prevented. Since the antenna of the transponder in the ear tag element according to the first aspect of the invention bears against the rigid part, the antenna is not subject to any major deformation which could damage the antenna.

In the case of a female ear tag element of the known type, it is not possible for the annular transponder to be positioned closely around the receiving opening for the pin of the male element, since the receiving opening has to be able to spring open during fitting of the male ear tag element. This presents problems in particular in the case of ear tags which are required to have a small external diameter, for example in the case of ear tags for sheep.

A collar in the form of a hard ring is often arranged around the receiving opening in female ear tag elements. If this is the case in a female ear tag element according to the invention, the flexible part of the body of the ear tag element adjoins the hard ring.

It is provided that the transponder lies on the side of the rigid part which is on the side of the boundary surface. However, it is also possible for the transponder to lie on the side of the flexible part which is on the side of the boundary surface, or partially on the side of the rigid part and partially on the side of the flexible part.

In an alternative embodiment, the antenna of the transponder bears against an outer surface of the rigid part. In this way, the assembly made up of rigid part and transponder is embedded in the flexible part. This embodiment offers increased resistance to forces which occur in the plane of the ear tag element. In addition, this embodiment is easy to produce, for example by the method according to claim 13.

It is generally advantageous if that surface of an ear tag element which in use faces towards the ear of the animal to be tagged is convex in form. The centre of curvature of the convexity in this case therefore lies on that side of the ear tag element which faces away from the ear. In this way, space is created between the ear tag element and the ear of the animal to be tagged. This prevents the ear tag from squeezing the ear when the ear becomes thicker, for example as a result of the animal growing.

It is provided that an ear tag element according to the first aspect of the invention also comprises means for taking a sample of biological material from the animal that is to be tagged. An ear tag element which comprises means of this type is described, for example, in international application PCT/IB2005/001698. Combining electronic identification by means of a transponder with identification by means of biological material, from which the "genetic fingerprint" of the tagged animal can be determined, produces highly reliable identification.

A second aspect of the invention relates to a method for producing ear tag elements which comprise a body and a transponder which is embedded in the said body, the transponder having a chip and an antenna which are connected to one another. This method is described in claim 9.

The arranging of the rigid housing around the antenna and chip of the transponder is a complex step in the production of the known ear tag. When producing the ear tag element by the method according to the second aspect of the invention, there is no need for a rigid housing to be arranged around the antenna and chip of the transponder. This eliminates a laborious step from the known production process, so that the method for producing ear tag elements according to the second aspect of the invention is more efficient and economical than the known method for producing ear tag elements.

In the method according to the second aspect of the invention, the chip and antenna of the transponder are moulded directly into either the rigid part or the flexible part of the body of the ear tag element. For this purpose, the chip and the antenna of the transponder are placed against the wall of the mould, with the result that the forces involved in moulding are absorbed.

Then, the other part (i.e. either the flexible part or the rigid part) is moulded onto that side of the part moulded first on which the transponder is located. During this second moulding operation, therefore, the transponder is embedded in the body of the ear tag element and the antenna of the transponder comes to lie at the boundary surface between the rigid part and the flexible part.

The materials of the rigid part and the flexible part are selected in such a way that during the second moulding operation bonding occurs between the rigid part and the flexible part of the body of the ear tag element.

The moulding of the two parts of the body of the ear tag element can take place in two different moulds or in a single mould, which is then provided with a displaceable wall.

A third aspect of the invention relates to the method of claim 13.

Arranging the rigid housing around the antenna and chip of the transponder is a complex step in the production of the ear tag. When producing the ear tag element by the method according to the third aspect of the invention, there is no need for a rigid housing to be arranged around the antenna and chip of the transponder. This eliminates a laborious step from the known production process, so that the method for producing ear tag elements according to the third aspect of the invention is more efficient and economically advantageous than the known method for producing ear tag elements.

In the method according to the third aspect of the invention, an antenna wire is arranged on an outer surface of a supporting element. This antenna will function as the antenna of the transponder. The antenna wire is connected to a chip, so that the antenna wire and the chip together act as a transponder.

The chip can be connected to the antenna wire before or after the antenna wire has been arranged on the supporting element.

The assembly comprising the transponder (which comprises the chip and the antenna) and the supporting element is then placed in a mould, after which at least part of the body of the ear tag element is moulded around the assembly of transponder and cylinder, in such a manner that the assembly comprising the transponder and the supporting element is embedded in the body of the ear tag element, and the antenna of the transponder comes to lie at the boundary surface between the supporting element and the part which has been moulded in the mould.

It is preferable for the antenna wire to be wound around the supporting element. This is advantageous since the antenna wire then comes to lie taut around the supporting element and the antenna wire itself or the transponder does not have to be handled as a loose component during the production process. This reduces the risk of damage to the transponder, in particular the antenna, considerably.

It is advantageous if the supporting element is rigid. This reduces the susceptibility of the antenna to damage. It is therefore provided that the supporting element forms the rigid part of the body in the sense of the first aspect of the invention.

The method according to the third aspect of the invention can be used to produce ear tag elements in accordance with the first aspect of the invention, i.e. ear tags whereof the body has a rigid part and a flexible part. In that case, the support forms the rigid part and the part of the body of the ear tag element which is moulded in the mould forms the flexible part.

BRIEF DESCRIPTION OF THE DRAWINGS:

Ear tag elements and methods according to the invention will be explained in more detail below on the basis of the appended drawings, which shows non-limiting exemplary embodiments. In the drawings:

FIG. 1 shows a cross section through a first embodiment of an ear tag element according to the first aspect of the invention, FIG. 2 shows a method for producing the ear tag element shown in FIG. 1, in accordance with the second aspect of the invention, FIG. 3 shows a cross section through a second embodiment of an ear tag element in accordance with the third aspect of the invention, FIG. 4 shows a method for producing the ear tag element shown in FIG. 3, in accordance with the third aspect of the invention.

Figure 5:
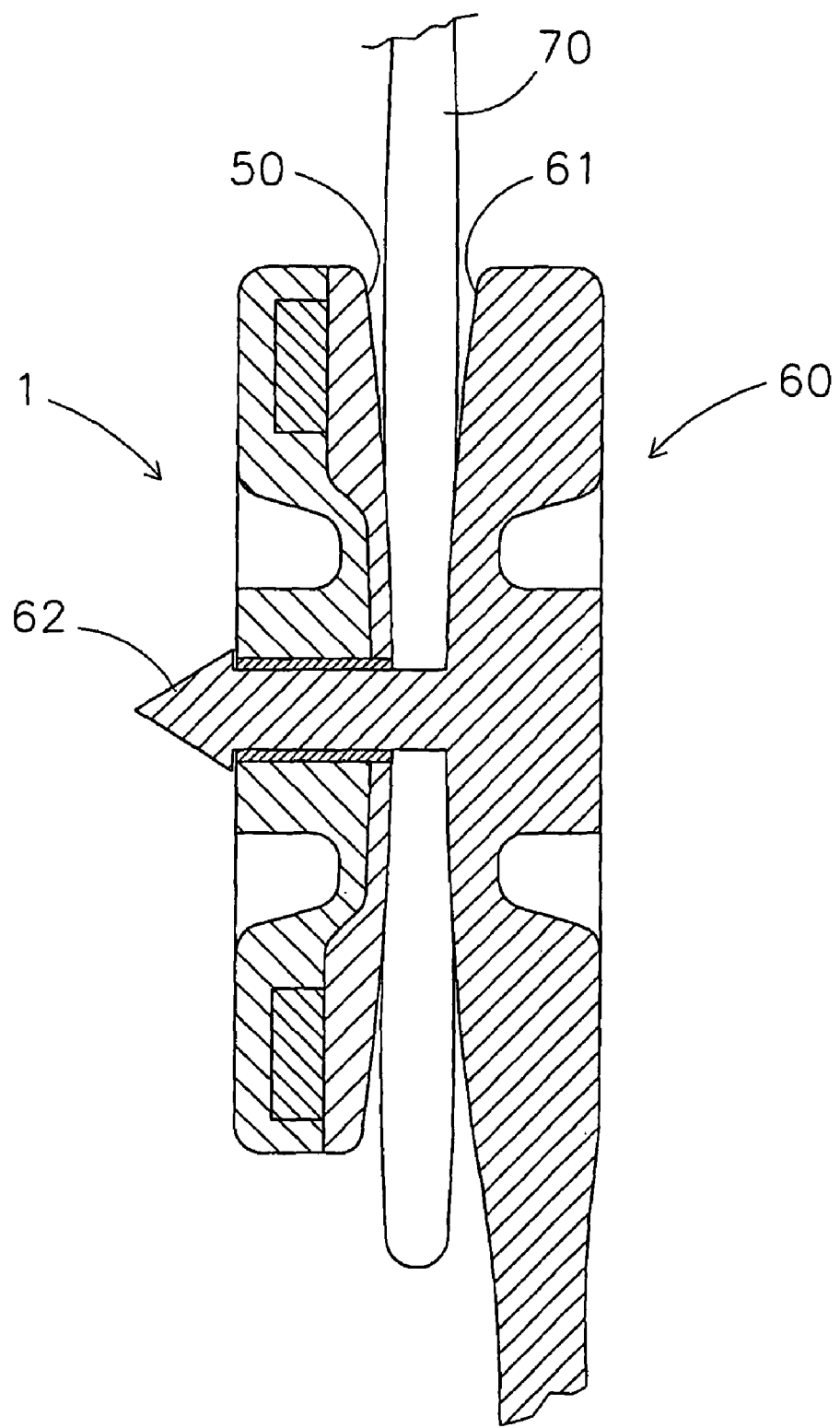
FIG. 5 shows an example of an ear tag with an ear tag element according to the invention.

DETAILED DESCRIPTION OF PREFERRED EMBODIMENTS:

FIG. 1 shows a first embodiment of an ear tag element according to the invention. In the embodiment shown in FIG. 1, a transponder 4, which comprises an antenna and a chip, is accommodated in a rigid plastic part 2 of the body 1 of the ear tag element. A flexible plastic part 3 is arranged in such a manner that the transponder 4 is embedded in the body 1 of the ear tag element. As can be seen clearly from FIG. 1, the transponder 4 lies at the boundary surface 6 between the rigid part 2 and the flexible part 3.

In the example shown in FIG. 1, the invention is employed in a female ear tag element. In this case, the flexible part 3 extends around the receiving opening 5 through which the male element is fitted when the ear tag is being positioned in an animal's ear. On account of the fact that the flexible part 3 lies around the receiving opening 5, the receiving opening 5 can be stretched when the male ear tag element is being fitted.

The deformation caused by this fitting operation in the flexible part 3 will not damage the antenna and chip of the transponder, which are embedded directly in the body of the ear tag element 1 without any form of housing. The strength of the rigid part 2 is such that it is scarcely deformed, if at all, under the influence of the forces which occur when fitting the male element, and consequently also suppresses the deformation in that piece of the flexible part 3 which is located in the immediate vicinity of the rigid part 2. As a result, the deformation imposed on the antenna and the chip of the transponder 4 remains limited, so that no damage will occur.

In the example shown in FIG. 1, a collar in the form of a hard ring 7 is arranged around the receiving opening 5. This ring 7 prevents the female ear tag part from being damaged during fitting of the male ear tag element. With a few adjustments which are known from the prior art, it is also possible for a ring of this type to be used, for example, as a tamper-evident ring.

In the example shown in FIG. 1, the transponder 4 lies on that side of the rigid part 2 which is on the side of the boundary surface 6. Since the rigid part 2 also suppresses the deformation in the piece of the flexible part 3 which lies close to the rigid part 2, it is also possible, as an alternative, for the transponder 4 to lie on that side of the flexible part 3, which is on the side of the boundary surface 6. Intermediate forms, in which the transponder 4 lies partly on the side of the rigid part 2 and partly on the side of the flexible part 3 are of course also possible.

In the example shown in FIG. 1, the external diameters of the rigid and flexible parts are equal at least at the location of the boundary surface 6. This produces a regular outer surface which is not susceptible to soiling.

FIG. 1 also shows that the ear tag element has a convex side 50. This convex side is preferably located on that side of the ear tag element which, in use, faces towards the ear of the animal that is to be tagged. The ear tag element is round in the example shown in FIG. 1.

FIG. 2 shows various stages involved in an example of the method for producing an ear tag element in accordance with the second aspect of the invention. In this example, the method in accordance with the second aspect of the invention is used to produce an ear tag element as shown in FIG. 1.

In the method shown in FIG. 2, first of all the antenna and the chip of the transponder 4 connected to it are arranged in an injection mould 20, preferably against the wall 21 of the mould cavity 22 in which the rigid part 2 of the body 1 of the ear tag element will be formed (cf. FIG. 2*a*). During the injection-moulding of the rigid part, the plastic material will flow around the antenna and the chip, so that the chip and the antenna of the transponder 4 are embedded in the rigid part 2.

Placing the chip and the antenna against the wall 21 of the mould cavity 22 prevents the forces which occur during injection moulding from damaging the transponder 4. The antenna and the chip of the transponder can be fixed in various ways with respect to the wall 21. By way of example, it is possible for the wall to be provided with a mandrel around which the antenna is placed, or with a recess in which the transponder is placed. As an alternative, the transponder can, for example, be held in position with the aid of magnetism.

This step leads to the semi-finished product shown in FIG. 2*b*. Here, the chip and antenna of the transponder bear against the free surface of the rigid part 2. However, this is not a problem, since the flexible part 3 of the body 1 of the ear tag element is then moulded onto the rigid part 2, during which step the transponder 4 is embedded in the body 1 of the ear tag element.

This is shown in FIG. 2*c*. In this example, the semi-finished product shown in FIG. 2*b* is taken out of the injection mould 20 and placed in a flexible injection mould 25 for injection-moulding the flexible part 3. Cavity 23 is provided in mould 25 for the injection-moulding of the flexible part 3.

As an alternative to injection-moulding the flexible part in a second mould 25, it is also possible for sliding elements to be present in injection mould 20, enabling the flexible part 3 to be moulded on in the same mould 320.

FIG. 3 shows a second embodiment of an ear tag element in accordance with the first aspect of the invention.

In the ear tag element shown in FIG. 3, the antenna 104*a* of the transponder bears against the outer side of the rigid part 102, and the assembly made up of rigid part and transponder 104 is embedded in the flexible part 103.

In this example, the invention is embodied in a female ear tag element, but it is equally possible to design a male ear tag element in this way. In addition, it is possible for the transponder to be arranged in a plate-like part of the ear tag element. The same also applies to the embodiment shown in FIG. 1.

FIG. 4 shows steps involved in a method for producing the ear tag element illustrated in FIG. 3, in accordance with the third aspect of the invention.

In the method shown in FIG. 4, an antenna wire 104*a* is arranged on an outer surface 108 of a supporting element 112. In the example of the ear tag element shown in FIG. 3, the rigid part 102 is the supporting element 112. It is preferable for the antenna wire 104*a* to be wound around the outer surface, since the antenna wire 104*a* then comes to lie taut against the supporting element 112.

A chip 104*a* is connected to the antenna wire 104*a* before or after the antenna wire 104*a* has been arranged on the supporting element 112. The antenna wire 104*a* and the chip 104*b* together function as a transponder 104.

This creates an assembly of transponder 104 (comprising antenna wire 104*a* and the chip 104*b* connected to it) and supporting element 112. This assembly is shown in FIG. 4*a*.

Then, the assembly comprising transponder 104 and supporting element 112 is placed in a mould 125 (cf. FIG. 4*b*). Mould 125 has a cavity 123 in which the part 113 of the body 101 of the ear tag can be formed.

Then, the part 113 of the body 101 of the ear tag element is moulded in mould 125. The assembly comprising the transponder 104 and the supporting element 112 is embedded in the body of the ear tag element, and the antenna 104*a* of the transponder 104 comes to lie on the boundary surface between the supporting element 112 and the part 103 which has been moulded in the mould.

For the inventive concept of the third aspect of the invention, it is not necessary for the supporting element 112 to be rigid or the part 113 to be flexible.

FIG. 4*c* shows the finished product produced using the method shown in FIG. 4.

FIG. 5 shows an example of an ear tag which comprises an ear tag element 1 according to the invention. The ear tag has been fitted to an ear 70 of an animal that is to be tagged. In this example, both the female ear tag element 1 and the male ear tag element 60 are provided with a convex surface 50, 61 on that side of the respective ear tag element 1, 60 which faces towards the ear 70 of the animal. In this example, the female ear tag element 1 has a substantially circular outer contour 9. In a variant, the male ear tag element also has a substantially circular outer contour.

FIG. 5 clearly shows that there is space between the convex surfaces 50, 61 which permits the thickness of the ear 70 to increase. This makes the ear tag more comfortable for the animal to wear. This space has its smallest dimension in the vicinity of the pin 62 of the male ear tag element and increases in the radially outward direction.

In the example shown in FIG. 5, the convexity extends over the entire side of the ear tag element 1. However, it is also possible for the convexity to be restricted to a part of the side of the ear tag element 60 which in use faces towards the animal's ear.

It is not necessary for the convex surface to be strictly geometrically spherical. Other curvatures, such as for example an egg-shaped convexity, a frustoconical or parabolic shape, also achieve the desired effect.

What is claimed is:

1. Ear tag element for tagging animals,
    which each tag element comprises a body and a transponder which is embedded in the said body, the transponder having a chip and an antenna which are connected to one another, and the body of the ear tag element comprising a rigid part, a flexible part and a boundary surface between these two parts,
    wherein at least the antenna of the transponder lies in the boundary surface, in such a manner that on at least one side the antenna bears against the rigid part and on at least one other side bears against the flexible part of the body.

2. Ear tag element according to claim 1, in which the rigid part has a free surface which forms at least part of the outer surface of the ear tag element.

3. Ear tag element according to claim 1, which ear tag element is a female ear tag element which comprises a receiving opening for receiving a male ear tag element, and in which ear tag element the flexible part of the body lies around the receiving opening, so that the flexibility of the flexible part enables the receiving opening to be deformed while the mail ear tag element is being arranged in it.

4. Ear tag element according to claim 3, which ear tag element also comprises a hard ring which extends around the receiving opening, and in which ear tag element the flexible part adjoins the hard ring.

5. Ear tag element according to claim 1, in which the antenna of the transponder bears against the outer side of the rigid part, and the assembly made up of rigid part and transponder is embedded in the flexible part.

6. Ear tag element according to claim 1, in which the transponder lies on that side of the rigid part which is on the side of the boundary surface.

7. Ear tag element according to claim 1, in which the transponder lies on that side of the flexible part which is on the side of the boundary surface.

8. Ear tag element according to claim 1, in which the external diameters of the rigid and flexible parts of the body are substantially equal.

9. Ear tag for tagging animals,
    which ear tag comprises a male ear tag element and a female ear tag element,
    at least the female ear tag element comprising an ear tag element according to claim 1.

10. Ear tag for tagging animals,
    which ear tag comprises a male ear tag element and a female ear tag element,
    at least the male ear tag element comprising an ear tag element according to claim 1.

11. Method for producing an ear tag element, which ear tag element comprises a body and a transponder which is embedded in the said body, the transponder having a chip and an antenna which are connected to one another,
    which method comprises the following steps:
    arranging the antenna and the chip of the transponder against a wall of a cavity in a mould for forming a first part of a body of the ear tag element,
    moulding the first part of the body of the ear tag element, in such a manner that the first part accommodates the transponder,
    moulding a second part of the body of the ear tag element, which second part, during moulding, is joined to the first part of the body of the ear tag element, in such a manner that the transponder is embedded in the body of the ear tag element and the antenna of the transponder comes to lie at the boundary surface between the first and second parts.

12. Method according to claim 11, in which the first part is the rigid part of the body and the second part is the flexible part of the body.

13. Method according to claim 11, in which the first part is the flexible part of the body and the second part is the rigid part of the body.

14. Method according to claim 11, in which the moulding of the second part of the body of the ear tag element takes place in a second mould.

15. Method for producing an ear tag element, which ear tag element comprises a body and a transponder which is embedded in the said body, the transponder having a chip and an antenna which are connected to one another, which method comprises the following steps:
    arranging an antenna wire on an outer surface of a supporting element,
    connecting a chip to the antenna wire, so that the chip and the antenna wire together form the transponder,
    placing the assembly made up of transponder and supporting element in a mould,
    moulding at least one part of the body of the ear tag element in the mould, in such a manner that the assembly made up of the transponder and the supporting element is embedded in the body of the ear tag element and the antenna wire of the transponder comes to lie at the boundary surface between the supporting element and the part which has been moulded in the mould.

16. Method according to claim 15, in which the antenna wire is wound around the supporting element.

17. Method according to claim 15, in which the supporting element is the rigid part of the body of an ear tag element.

18. Method according to claim 17, in which the part of the body of the ear tag element which is moulded in the mould is the flexible part of the body of an ear tag element.

* * * * *